INVENTOR.
HAROLD J. CROMWELL
BY
Lockwood, Woodard, Smith & Weikart
Attorneys

INVENTOR.
HAROLD J. CROMWELL

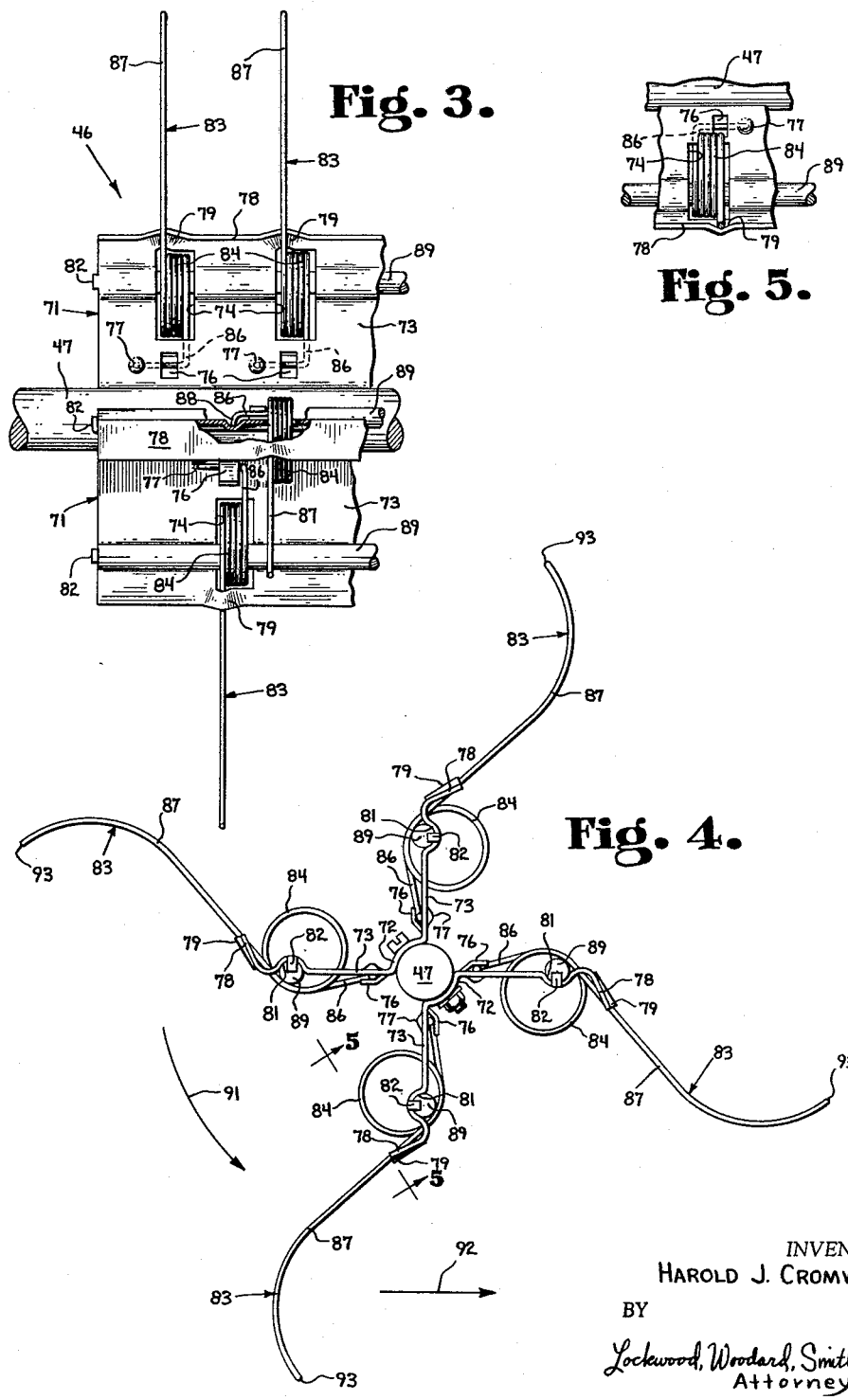

May 18, 1965 H. J. CROMWELL 3,183,653
POWER DRIVEN LAWN SWEEPER
Filed June 1, 1962 5 Sheets-Sheet 4

INVENTOR.
HAROLD J. CROMWELL
BY
Lockwood, Woodard, Smith & Weikart
Attorneys

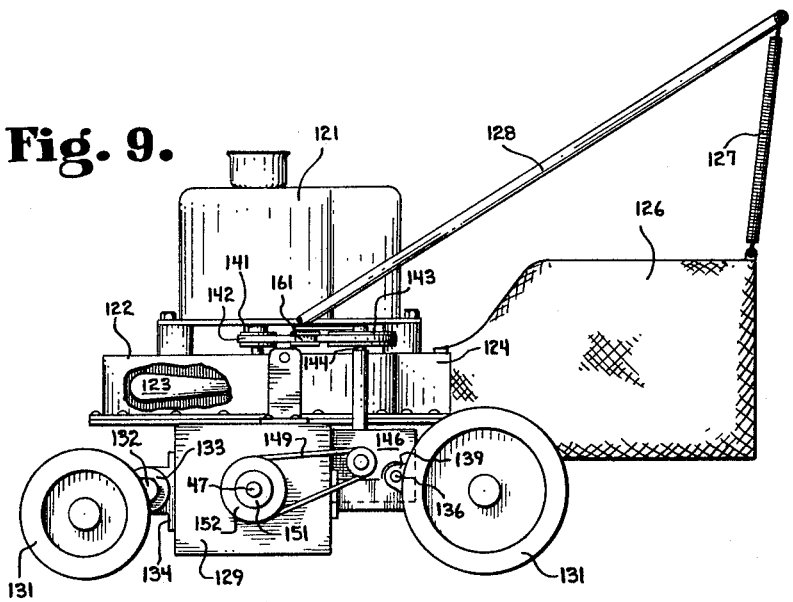
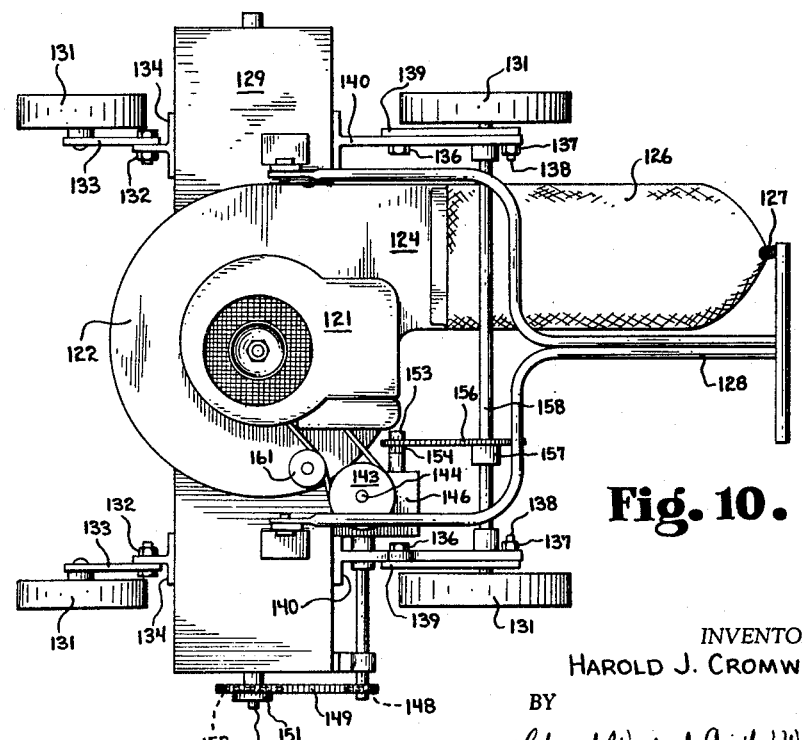

United States Patent Office 3,183,653
Patented May 18, 1965

3,183,653
POWER DRIVEN LAWN SWEEPER
Harold J. Cromwell, 840 Longfellow Road,
Anderson, Ind.
Filed June 1, 1962, Ser. No. 199,429
10 Claims. (Cl. 56—27)

This invention relates generally to lawn raking or sweeping equipment, and more particularly to a lawn sweeper having a motor for driving the sweeper rotor.

While a variety of types of lawn sweepers is presently available, there are several factors which make those which are available inadequate for the intended work. Most will not pick up grass clippings and most will not pick up debris of small size or light weight which can frequently be found in a lawn, particularly where trees are in abundance. Furthermore, many machines are adversely influenced by winds and some can actually harm the grass by tending to uproot it.

It is, therefore, a general object of the present invention to provide improved means for removing all kinds of debris from a lawn.

It is a further object of this invention to provide means for loosening debris which has been entangled in the lawn and remove it from the lawn.

It is a further object of this invention to provide a machine which will correct a matted condition of the grass and which will pick up creeping weeds and undesirable grasses so that they may be cut by a mower blade, and which at the same time avoids damage to desirable grasses.

It is a still further object of this invention to provide a machine of the foregoing character capable of miscellaneous additional functions, such as sweeping walks, driveways and garages.

Described briefly, a typical embodiment of the invention employs a fan and a sweeper rotor, both of which are driven directly or by belt and pulley couplings to a motor.

The sweeper rotor is disposed in a housing and extends transversely of the direction of travel of the sweeper. The fan is disposed above the sweeper rotor to move material from the grass out into a receptacle in the form of a bag. The sweeper rotor includes a shaft with a bracket extending outwardly from the shaft along the principal portion of the length of the shaft. The bracket is of a unique form whereby a plurality of specially shaped tines is mounted to the bracket along its length. At strategic locations there are also brushes for cooperation with the tines in removing the debris from the lawn. The nature of the tines and the brushes and of their mounting in the sweeper is such that the amount of raking and sweeping desired can be obtained, without damaging the grass and without subjecting the rotor to damage in the event an immovable object is encountered.

The full nature of the invention will be understood from the accompanying drawings and the following description and claims:

FIG. 3 is an enlarged fragmentary front view of a sweeper rotor according to this invention.

FIG. 4 is a side elevational view of the rotor of FIG. 3.

FIG. 5 is a fragmentary view of the rotor illustrating the tine mounting details.

FIG. 9 is a side elevational view of a second embodiment of the sweeper with a part broken away to show an interior detail.

FIG. 10 is a top plan view of the second embodiment.

Figure 1:
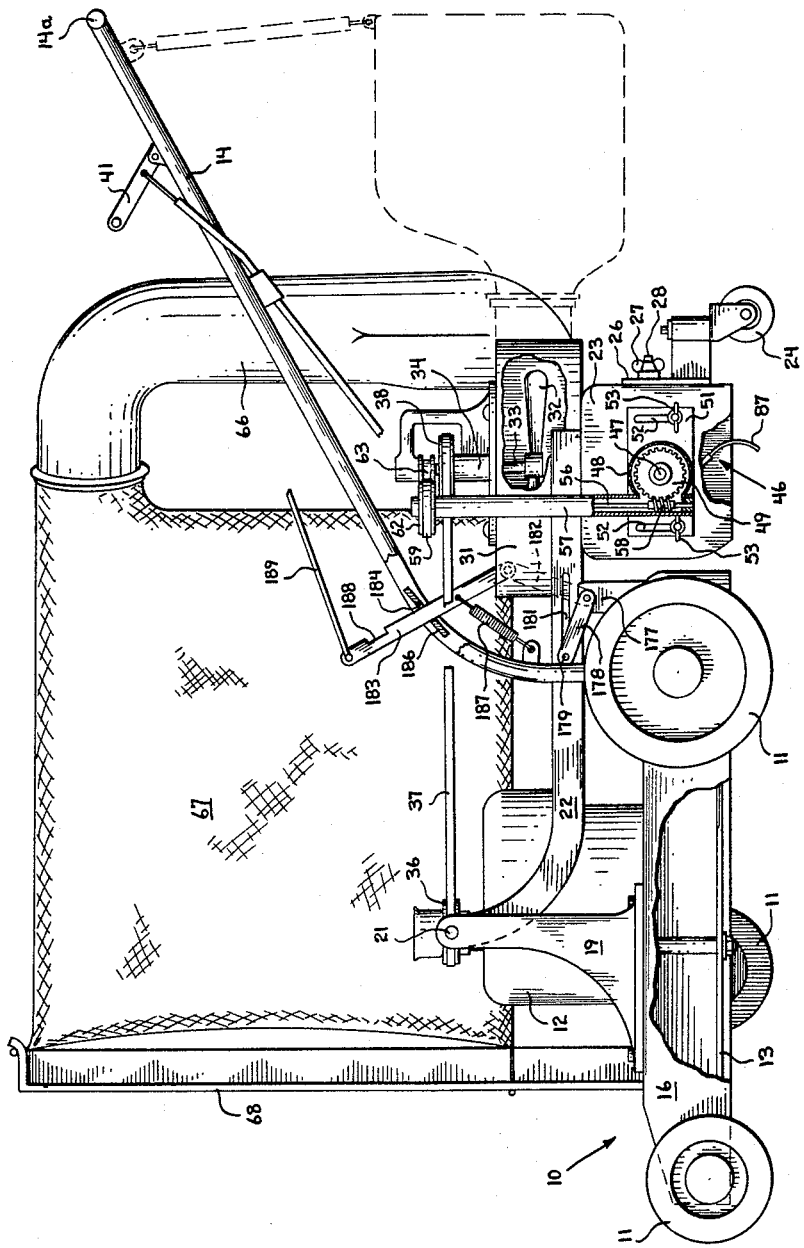
FIG. 1 is a side elevational view of a typical embodiment of the present invention in a lawn mower-sweeper combination, with parts broken away to show certain interior details.
Figure 2:
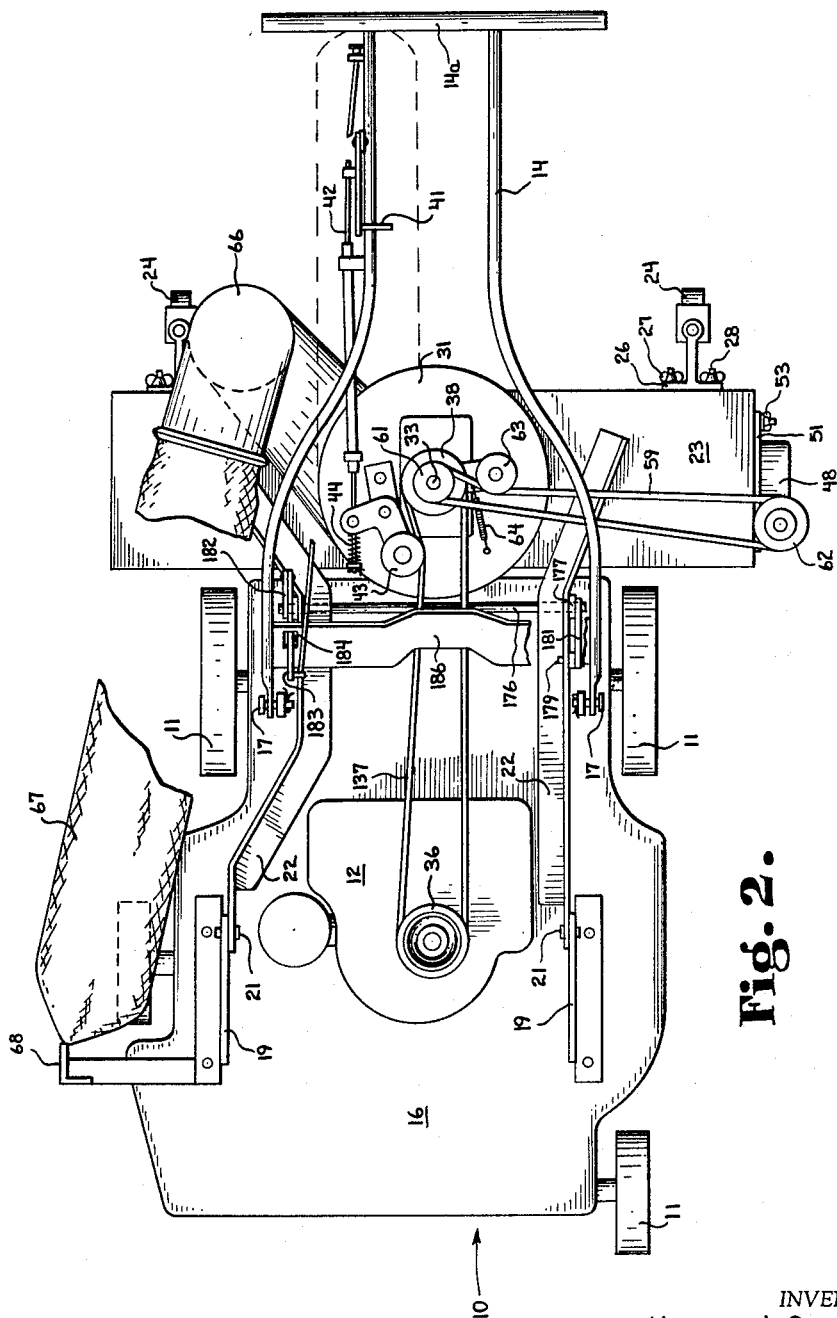
FIG. 2 is a top plan view of the embodiment of FIG. 1, with parts broken away to show certain details.

Referring to FIGS. 1 and 2, the combination illustrated therein includes a mower portion 10 supported by the wheels 11 and having a motor 12 driving the mower blade 13. A handle 14 is pivotally mounted by means of the pins 17 to the mower frame 16 which, in the illustrated embodiment, also serves as the mower blade housing.

On each side of the motor there is mounted an upstanding bracket 19. At the upper end of each bracket 19 is a pin 21 pivotally securing the front ends of the sweeper support arms 22 to the brackets 19. A sweeper housing 23 is secured to the rear end of the arms 22 and extends transversely of the direction of travel of the sweeper. A pair of casters 24 is secured to the rear of the housing 23 by means of vertically slotted mounting plates 26 and the thumb nuts 27 received on the studs 28 which are affixed to the housing 23. Thus, it is seen that the support for the sweeper housing 23 is derived from the arms 22 and the casters 24, and the elevation of the housing is adjustable by virtue of the vertical slots in the mounting plates 26.

A fan housing 31 is mounted atop the sweeper housing 23 and encloses the sweeper fan 32. The sweeper fan is supported and driven by a vertical shaft 33 carried by the bearing unit 34. The drive for shaft 33 is derived from the motor shaft by means of the motor pulley 36, drive belt 37 and fan pulley 38. The belt 37 can be tightened or loosened at will by operation of the lever 41 which is mounted to the handle 14 and operates the wire 42 to engage or disengage the idler 43. The spring 44 tends to maintain engagement of the idler 43 with the belt 37 to provide the sweeper drive at all times except when intentionally disengaged by pulling the lever 41 toward the handle bar 14a.

The sweeper rotor 46 includes the forwardly curved tine portions 87 and the shaft 47 carried in the bearing blocks 48 and having a worm gear 49 at its left-hand end. The bearing blocks 48 are secured to the housing 23 by means of the vertically slotted plates 51 having vertical slots 52 therein. The vertical location of the bearing blocks 48 with respect to the sweeper housing can be changed by loosening the thumb screws 53 and move the plates 51 to the desired vertical position before again tightening the thumb screws 53.

A worm shaft 56 is mounted in the tube 57 secured to the sweeper housing 23 and has a worm tooth 58 located at its lower end and engaging the gear 49. The worm shaft is driven by means of the sweeper drive belt 59 transmitting power from the sweeper drive pulley 61 mounted on the shaft 33 to the sweeper driven pulley 62 mounted on worm shaft 56. Tension is maintained in the belt 59 by means of the idler pulley 63 held against the belt by the spring 64.

In the illustrated embodiment a fan outlet stack 66 is secured to the fan housing for conveying debris from the fan into the collector bag 67, the front end of which is supported by the bracket 68, which is in turn secured to the housing 16. As an alternative construction, the stack 66 can be omitted and a collector bag inlet secured directly to the fan housing 31 with another support for the bag being provided by the handle 14. This construction is designated by the dotted outline in FIGS. 1 and 2.

In the operation of the machine, as it is pushed or selfpropelled forwardly along the ground, the forwardly curved tines pick up debris from the grass, the rotor being driven clockwise as viewed in FIG. 1. At the same time, the fan, being an air propeller, establishes a current of air up through the open bottom of the sweeper housing, through the fan housing, and out into the collector bag. Debris picked up by the rotor becomes airborne in the housing and is carried into the collector bag.

It is contemplated that in an alternative construction, the rotor could be turned end-for-end and driven counterclockwise, possibly at a higher speed than in the illustrated embodiment, whereby the rotor would tend to assist in propulsion of the sweeper along the ground.

If it is desired to cut with the mower but not sweep, the sweeper rotor can be elevated by means which will now be described.

A cross-shaft 176 is pivotally mounted on supports 177 secured to housing 16. Arms 178 are secured to cross-shaft 176 and have pins 179 in their distal ends. Pins 179 are received in slots 181 in the support arms 22. Thus, as cross-shaft 176 is turned clockwise, pins 179 move toward the rear in slots 181, thus elevating the sweeper rotor. When the pins 179 have passed a point above the axis of shaft 176, the weight of the sweeper rotor and housing will tend to move the pins to the rear end of the slots 181 to lock the sweeper rotor in elevated condition.

To facilitate rotation of the cross-shaft 176, an arm 182 is secured to the cross-shaft. A link 183 is pinned to the distal end of arm 182 and extends up through a hole 184 in the cross piece 186 secured to handle 14. Spring 187 has its forward end secured to handle 14 at a point whereby the spring holds the link 183 against the forward edge of hole 184. A notch 188 is provided in the rear edge of link 183 and a cord 189 is secured to the distal end of the link.

To rotate the cross-shaft 176, the cord 189 is pulled to the rear and the handle bar 14a is raised until the rear edge of hole 184 engages the notch 188. The handle bar 14a is then pushed down whereupon shaft 176 is rotated clockwise and the sweeper rotor is raised. The rotor may again be lowered by reversing this procedure.

Referring to FIGS. 3, 4 and 5, the sweeper rotor 46 includes the shaft 47 to which are mounted the tine support brackets 71. Each of the two support brackets illustrated is elongated in form, having a central portion 72 engaging the outer surface of shaft 47 and secured thereto by bolts passing through the shaft. Integral with the central portion are two outwardly extending portions 73 which are generally L-shaped in cross section. The outwardly extending portions have openings 74 therein and adjacent each opening and radially inward therefrom is a tab 76. A recess 77 is located adjacent each tab 76 at approximately the same radial distance from the axis of the shaft 47.

The outer marginal portion 78 of the bracket provides the "short leg" of the L-shaped cross section and includes generally V-shaped depressions 79 therein adjacent each of the openings 74. A longitudinal depression or groove 81 of semi-circular cross section extends the length of the bracket and a tab 82 is provided at each end of the depression 81.

A tine is provided for each of the openings in the bracket. Each tine 83 is made of solid steel spring wire in a typical embodiment and includes a coil portion 84, an L-shaped short leg portion 86 and a forwardly curved long leg portion 87. The tip 88 of the short leg is bent slightly so that when the coil 84 is located in the opening 74 and retained in place by the longitudinally extending retainer rod 89 located in the depression 81, the tip 88 will be disposed in recess 77. The long leg rests in the V-shaped depression 79.

It will be understood that rotation of the rotor is in the direction of the arrows 91 in FIG. 4 and movement of the machine during the sweeping operation is in the direction of arrow 92. As the outer tips 93 of the tines move into the grass to pick up any debris present, the degree of tension in each tine, and therefore the working force available, is determined by the extent of winding in the coil portion 84 before the tine is mounted in its support bracket. If an immovable object is struck, the long leg of the tine will be moved rearwardly with respect to its support bracket. At the same time, the tip 93 moves to a shorter radial distance from the axis of the shaft 47, permitting the tine to clear the obstruction. Upon clearing the obstruction, the V-shaped stop 79 guides the tine as it springs back to its proper orientation. The tab 76, of course, retains the short leg of the tine, and location of the tip 88 in the recess 77 keeps the short leg from moving out from under the tab 76.

In addition to avoiding damage upon striking immovable objects, the above described construction makes it possible for the tines to avoid too much force on an object in the grass or upon grass roots, and yet provide sufficient initial tension to perform the assigned work. The manner of confining the spring allows a low rate spring to be used while still having an effective initial tension.

Figure 6:
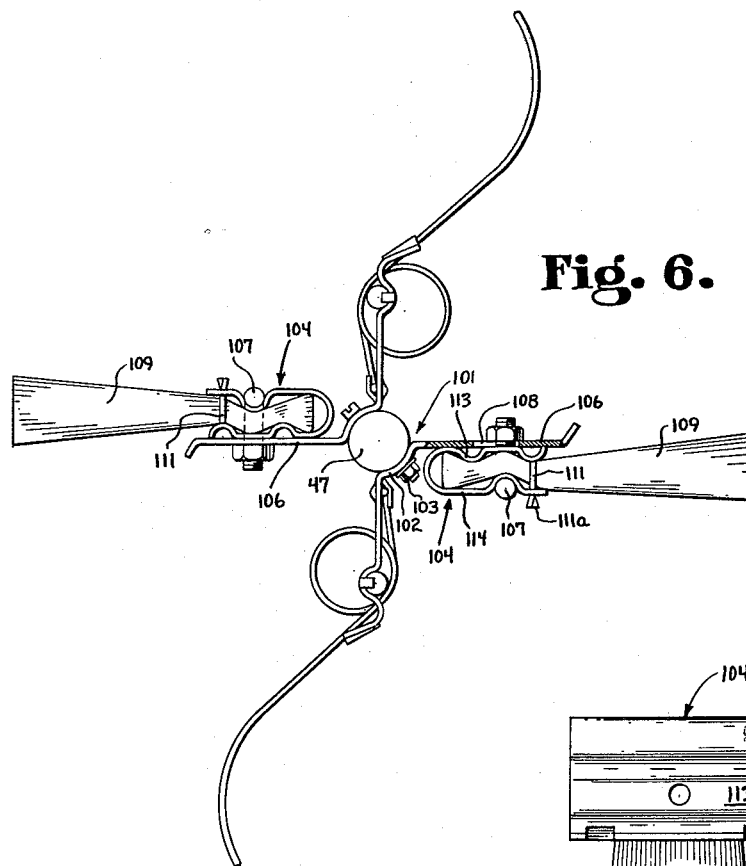
FIG. 6 is a side elevational view of a second embodiment of the sweeper rotor.
Figure 8:
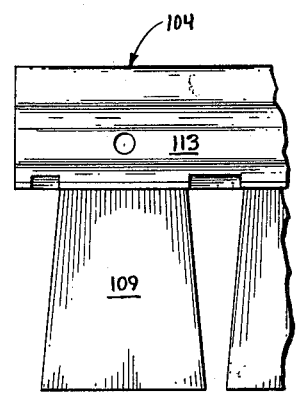
FIG. 8 is a fragmentary view of the embodiment of FIG. 6 illustrating certain brush mounting details viewed from the front side of the brushes.
Figure 7:
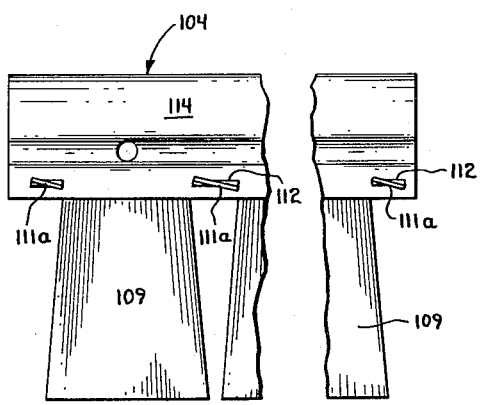
FIG. 7 is a fragmentary view of the embodiment of FIG. 6 illustrating certain brush mounting details viewed from the back side of the brushes.

Referring to FIGS. 6, 7 and 8, a variation of the sweeper rotor is shown. In this variation, one-half of each bracket is identical to the brackets of FIGS 3, 4 and 6, whereas the other half of the bracket is devoted to mounting brushes. This latter feature will now be described. The bracket 101 includes the center portion 102 secured by the bolts 103 to the shaft 47. An elongated brush clip 104 is secured to the outwardly extending portion 106 of the bracket by means of the T-headed bolts 107, the bolt shanks being received by radially extending slots 108 in the bracket portion 106. The clips have a generally U-shaped cross section with front and rear balls 113 and 114 respectively.

Brushes 109 which may be made of good broom material is desired, are secured in the clip 104 by bending the tab 111 on the outer margin of the front wall 113 of the clip to the rear and passing the end 111a thereof through the slot 112 provided in the outer margin of the rear wall of the clip. The end 111a is bent as illustrated in FIG. 7 to prevent its pulling back out of the slot 112. By virtue of the longitudinally ribbed front and rear walls 113 and 114 of the clips 104, satisfactory rigidity is provided and the brush 109 is securely gripped once the tabs 111 have been secured in the slots 112. The radially extending slots 108 in the bracket portion 106 permit variation of the effective length of the brushes independent of the effective length of the tines, a feature particularly advantageous when the sweeper is to be used for sweeping hard surfaces such as walks.

FIGS. 9 and 10 show an embodiment of the invention where a cutting operation is not provided. In this embodiment the motor 121 is mounted to the frame 122 which serves as a housing for the fan 123. The housing 122 has an outlet 124 to which is secured the inlet of collector bag 126, the rear end of which is supported by spring 127 secured to the handle 128. A housing 129 is secured to the housing 123 and encloses the sweeper rotor which may be either of the two rotors described above. The whole assembly is supported by the ground wheels 131. The elevation can be varied by loosening the bolts 132 securing the front wheel arms 133 to the brackets 134 and rotating the arms with respect to the brackets in the amount necessary to obtain the desired elevation. The rear wheels are adjusted by loosening the bolt 136 and the lock nut 137 on the rear wheel arm locating stud 138 whereby the rear wheel arms 139 may be rotated with respect to the bracket 140.

The drive for the sweeper rotor is obtained from the motor shaft pulley 141 through the belt 142, pulley 143 on the input shaft 144 to the gear box 146. The gear box provides an output from the sprocket 148 through chain 149 to sprocket 151 driving the rotor shaft 47. A one-way clutch 151 can be coupled between the sprocket 152 and the rotor shaft 47 or between the sprocket 148 and the gear box output shaft. This protects the rotor in the event the unit is pulled backward with the tines on the ground or in the grass.

An output shaft 153 and sprocket 154 are provided from the gear box for driving of the rear wheels by means of the chain 156 and the sprocket 157 secured to the axle 158. The axis of shaft 153 and the rear wheel arm mounting bolts 136 are aligned so as to maintain correct chain tension in chain 156 when the wheels are raised or lowered.

The idler pulley 161 engaging the drive belt 142 can be adjusted by suitable linkage connected to a lever on handle 128 to provide a clutch. The linkage may be conventional and therefore illustration or description thereof is not required.

From the foregoing description it can be readily appreciated that the present invention is well suited to the accomplishment of the objects of this invention stated hereinabove as well as other objects not specifically mentioned. It is recognized that other variations within the scope of the invention may now occur to one skilled in the art. Therefore, while the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. In a lawn sweeping machine having
a frame,
a motor on said frame, and
ground wheels supporting said frame,
a sweeper rotor mounted to said frame for rotation thereon and coupled to said motor and driven thereby and including: a shaft, an elongate support bracket with an outwardly extending portion, said bracket being secured to said shaft and having openings in said portion spaced along the length thereof, and spring tines having coils with portions thereof passing through said openings and legs extending outwardly from one side of said bracket, with each tine terminating at a point outward from the bracket, each of said coils disposed in said openings with the longitudinal axis of said coils substantially parallel to said bracket, and retaining means passing through said coil on the opposite side of said bracket from the tine extension for supporting said tine on said bracket.

2. A lawn sweeping machine comprising:
a motor;
a sweeper rotor coupled to said motor and driven thereby;
and wheels supporting said motor and rotor for movement thereof over the ground;
said rotor including a shaft extending generally parallel to the axes of rotation of said ground wheels,
and said rotor including an elongated bracket having outwardly extending portions joined at their inner margins by a central portion integral therewith and lying in partially encircling engagement with said shaft throughout a substantial portion of the length of said shaft and secured to said shaft, at least one of said outwardly extending portions having openings spaced along the length thereof,
and said rotor including a plurality of tines mounted in said one of said outwardly extending portions, said tines having coil portions received in said openings and having legs extending outwardly from one side of said one outwardly extending bracket portion in a curve with the outer extremities of tines which are moving below the rotor shaft as the rotor is driven pointing generally toward the front of the machine, and said rotor including retaining means engaging said tines and said bracket and passing through coil portions on the side of said bracket opposite said outwardly extending legs.

3. The combination of claim 1 wherein brushes are secured to said support bracket.

4. A lawn sweeping machine as set forth in claim 1 and further comprising:
a support plate member mounted to said shaft and extending outwardly therefrom,
a plurality of brushes, and means mounting said brushes on said outwardly extending support plate, said mounting means including clip members enveloping and gripping portions of said brushes, said clip members being generally elongated and having a generally U-shaped cross section, and bolts passing through apertures in said support and clip members to secure said members together, the apertures in one of said members being elongated to accommodate selective radial positioning of said brushes with respect to said shaft.

5. In a lawn sweeper, a sweeper rotor comprising:
an elongate shaft;
an elongate support bracket secured to said shaft and having a portion extending outward from said shaft,
said outward extending portion including a plurality of tine retainer units, each unit including an opening to receive a tine coil;
a continuous wire tine mounted in each unit and having a coil portion disposed in said opening with legs extending from said coil portion and engaging one side of said bracket;
and an elongate tine retainer bar extending through said tine coil portions on the opposite side of said bracket from said legs and interlocked between said coil portions and said support bracket retaining said coil portions in said openings.

6. In a lawn sweeper, a sweeper rotor comprising:
an elongate shaft;
an elongate support bracket secured to said shaft and having a portion extending outward from said shaft,
said outward extending portion having a generally L shaped cross section,
and said outward extending portion including a plurality of tine retainer units, each unit comprising an opening to receive a tine coil, a recess to receive and retain a tine end, and a tab to retain the tine end in said recess,
and a depression in an outer margin of said outwardly extending portion to receive a tine portion and assist alignment thereof;
a continuous wire tine mounted in each unit and having a coil portion disposed in said opening with a short L-shaped leg portion retained by said tab and having a tip in said recess, said tine having a long leg portion engaging said marginal depression on one side of said bracket and extending outwardly therefrom and terminating at a point outward therefrom;
and an elongate tine retainer bar extending through said tine coil portions on the opposite side of said bracket from said long leg portions and interlocked between said coil portions and said support, retaining said coil portions in said openings.

7. The rotor as set forth in claim 6 wherein said long leg portion curves forwardly as it extends outwardly from said one side of said bracket at said marginal depression to its termination point.

8. In a lawn sweeper, a sweeper rotor as set forth in claim 5 and further comprising:
a second elongate support bracket secured to said shaft and having a portion extending outward from said shaft;
a plurality of brushes;
an elongate clip having front and rear walls in spaced relation and joined by an intermediate portion to provide a generally U-shaped cross-section and having longitudinal ribs in said walls cooperating to grip portions of said brushes therebetween;

and means securing said clip to said outward extending bracket portion of said second bracket.

9. The rotor as set forth in claim 8 further comprising tabs integral with one of said walls and extending therefrom through openings in the other of said walls and deformed to lock against said other wall to retain said walls in gripping relation to said brushes.

10. In a lawn sweeper, a sweeper rotor comprising:
an elongate shaft;
an elongate support bracket having a central portion secured to said shaft, said central portion engaging and partially encircling said shaft, and said bracket having portions extending outward from said shaft in different directions,
one of said outward extending portions including a plurality of tine retainer units, each unit including an opening to receive a tine coil;
a continuous wire tine mounted in each unit and having a coil portion disposed in said opening with legs extending from said coil portion and engaging one side of said bracket;
an elongate tine retainer bar extending through said tine coil portions on the opposite side of said bracket from said legs and interlocked between said coil portions and said support bracket to retain said coil portions in said openings;
and a plurality of brushes mounted on another of said outward extending portions.

References Cited by the Examiner
UNITED STATES PATENTS

| | | | |
|---|---|---|---|
| 2,110,071 | 3/38 | Pociecha | 56—296 |
| 2,505,576 | 4/50 | Reitan | 56—27 |
| 2,538,643 | 1/51 | Gregory | 56—27 X |
| 2,599,080 | 6/52 | Thys | 56—400 X |
| 2,657,408 | 11/53 | Machovec | 56—27 X |
| 2,661,584 | 12/53 | Ronning | 56—27 X |
| 2,809,389 | 10/57 | Collins et al. | 15—339 |

ANTONIO F. GUIDA, *Acting Primary Examiner.*

ALDRICH F. MEDBERY, ARNOLD RUEGG,
*Examiners.*